UNITED STATES PATENT OFFICE.

CAROLINE J. WILKINS, OF DENVER, COLORADO.

REMEDIAL COSMETIC.

SPECIFICATION forming part of Letters Patent No. 431,157, dated July 1, 1890.

Application filed October 1, 1889. Serial No. 325,714. (No specimens.)

*To all whom it may concern:*

Be it known that I, CAROLINE J. WILKINS, a citizen of the United States, residing at Denver, in the county of Arapahoe and State of Colorado, have invented a certain new and useful Remedial Cosmetic; and I do declare the following to be a full, clear, and exact description of the invention, such as will enable others skilled in the art to which it appertains to make and use the same.

My invention relates to a new and useful composition of matter for use as a cosmetic, lotion, or wash, and possessing therapeutic qualities, fitting and adapting it for employment not only as a mere cosmetic for preserving and softening the skin, but also for use as a healing or remedial application in removing pimples, rash, and other eruptive diseases.

My composition of matter consists of the following ingredients, combined in about or substantially about the proportions noted: one grain of borax, two ounces of dextrine, one ounce of alcohol, three and one-half ounces of water, one-half ounce of witch-hazel bark, one grain of madder.

To properly combine the ingredients noted, dissolve the borax in one-half ounce of water and mix the solution with the dextrine and add the three and one-half ounces of water. Next add to the mixture the alcohol, witch-hazel bark, and the madder in the order named, sufficient water having first been added to the witch-hazel bark to extract its strength and the resulting liquid reduced to one-half ounce in quantity by heating. The madder also before use as an ingredient of the mixture is dissolved in one-half ounce of water. Lastly, a few drops or other sufficient quantity of a suitable perfume are stirred in. Thus prepared, the composition forms a beneficial cosmetic for softening and preserving the skin, preventing tanning and wrinkles, at the same time possessing such therapeutic and healing qualities that it forms a very effective and purifying lotion for pimples, rash, eruptive diseases, &c.

Having thus described my invention, what I claim is—

The herein-described composition of matter for a remedial cosmetic, consisting of borax, dextrine, alcohol, water, extract of witch-hazel bark, and madder, in the proportions substantially as set forth.

In testimony whereof I affix my signature in presence of two witnesses.

CAROLINE J. WILKINS.

Witnesses:
OTIS B. SPENCER,
WM. MCCONNELL.